United States Patent
Bayer et al.

(10) Patent No.: US 12,030,548 B2
(45) Date of Patent: Jul. 9, 2024

(54) STEERING COLUMN FOR A MOTOR VEHICLE

(71) Applicants: thyssenkrupp Presta AG, Eschen (LI); thyssenkrupp AG, Essen (DE)

(72) Inventors: Tim Bayer, Luechingen (CH); Simon Blaettler, Grabs (CH); Daniel Kreutz, Feldkirch (AT); Sebastian Huber, Goefis (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 17/923,187

(22) PCT Filed: May 4, 2021

(86) PCT No.: PCT/EP2021/061608
§ 371 (c)(1),
(2) Date: Nov. 3, 2022

(87) PCT Pub. No.: WO2021/224200
PCT Pub. Date: Nov. 11, 2021

(65) Prior Publication Data
US 2023/0182802 A1     Jun. 15, 2023

(30) Foreign Application Priority Data

May 7, 2020    (DE) ..................... 10 2020 205 728.1
May 7, 2020    (DE) ..................... 10 2020 205 731.1

(51) Int. Cl.
*B62D 1/181*    (2006.01)
*B62D 1/185*    (2006.01)

(52) U.S. Cl.
CPC ............. *B62D 1/181* (2013.01); *B62D 1/185* (2013.01)

(58) Field of Classification Search
CPC ......... B62D 1/181; B62D 1/185; B62D 1/187
See application file for complete search history.

(56) References Cited

U.S. PATENT DOCUMENTS

2012/0247259 A1\*  10/2012  Mizuno ................. B62D 1/181
                                                            74/493
2013/0160597 A1\*  6/2013   Masuda ................ B62D 1/181
                                                            74/493

(Continued)

FOREIGN PATENT DOCUMENTS

CN    108909822 A  \* 11/2018  ............... B62D 1/18
CN    110001755 A  \*  7/2019  ............... B62D 1/187

(Continued)

OTHER PUBLICATIONS

Harhoff, Telescopic Steering Shaft, Feb. 12, 2004, EPO, DE 20317344 U1, Machine Translation of Description (Year: 2004).\*

(Continued)

*Primary Examiner* — Amy R Weisberg
*Assistant Examiner* — Matthew D Lee
(74) *Attorney, Agent, or Firm* — thyssenkrupp North America, LLC

(57) ABSTRACT

A steering column for a motor vehicle may include a casing unit in which a steering spindle is mounted such that the steering spindle is rotatable about a longitudinal axis that extends in a longitudinal direction. The casing unit has at least two telescopically guided casing tubes that are adjustable relative to one another in the longitudinal direction, an intermediate element that is movable in the longitudinal direction and is arranged between the casing tubes, and a positioning device for positioning the intermediate element in the longitudinal direction relative to the casing tubes. The positioning device may have elongate guide tracks that are arranged on the casing tubes and the intermediate element (Continued)

and interact with one another such that they position the casing tubes and the intermediate element relative to one another in a defined manner.

13 Claims, 9 Drawing Sheets

(56) References Cited

U.S. PATENT DOCUMENTS

| | | | |
|---|---|---|---|
| 2017/0113710 A1* | 4/2017 | Matsuno | B62D 1/187 |
| 2017/0305454 A1 | 10/2017 | Park | |
| 2018/0148084 A1 | 5/2018 | Nash et al. | |
| 2018/0251147 A1 | 9/2018 | Heitz et al. | |
| 2019/0111960 A1* | 4/2019 | Freudenstein | B62D 1/185 |
| 2019/0210633 A1* | 7/2019 | Derocher | B62D 1/181 |
| 2020/0331513 A1 | 10/2020 | Bayer et al. | |
| 2021/0197882 A1 | 7/2021 | Bayer et al. | |
| 2021/0291890 A1 | 9/2021 | Kreutz et al. | |
| 2022/0048556 A1* | 2/2022 | Kim | B62D 1/181 |
| 2022/0227410 A1* | 7/2022 | Kremer | B62D 1/183 |

FOREIGN PATENT DOCUMENTS

| | | | |
|---|---|---|---|
| DE | 20317344 U1 * | 2/2004 | ............. B62D 1/185 |
| DE | 102015216326 A1 * | 6/2016 | ............. B62D 1/181 |
| DE | 102015216326 A1 | 6/2016 | |
| DE | 102017221004 A1 | 5/2019 | |
| DE | 10 2019 108 466 A1 | 2/2020 | |
| DE | 102022118200 B3 * | 5/2023 | |
| WO | 2020007723 A1 | 1/2020 | |
| WO | 2020245001 A1 | 12/2020 | |

OTHER PUBLICATIONS

English Translation of International Search Report issued in PCT/EP2021/061608, dated Jul. 28, 2021.

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2021/061608, filed May 4, 2021, which claims priority to German Patent Application No. DE 10 2020 205 728.1, filed May 7, 2020, and to German Patent Application No. DE 10 2020 205 731.1, filed May 7, 2020, the entire contents of which are incorporated herein by reference.

FIELD

The present disclosure generally relates to steering columns, including steering columns for motor vehicles.

BACKGROUND

A steering column for a motor vehicle has a steering shaft with a steering spindle which is mounted in a casing unit such that it can be rotated about its longitudinal axis, to the rear (in the driving direction) end, facing the driver, of which steering column a steering wheel for introducing a steering command by way of the driver is attached. The casing unit is held by a mounting unit which is fastened to the vehicle body, the setting of the steering wheel position relative to the vehicle body being made by way of an adjustment of the casing unit relative to the mounting unit.

A longitudinal adjustment, in the case of which the steering wheel can be adjusted rearward or forward relative to the driver's position in the longitudinal direction, that is to say in the direction of the longitudinal axis or in the axial direction of the longitudinal axis, is made possible in the case of the steering column of the generic type by way of a telescopic configuration of the casing unit and the steering spindle. Moreover, the steering column can be pushed together in the longitudinal direction in the case of a crash, as a result of which it is effectively prevented that the steering column penetrates into the interior of the passenger cell and leads to injuries of the occupants.

The casing unit has at least two casing tubes, with at least one inner casing tube (also called an inner casing tube or inner casing) which dips coaxially into at least one outer casing tube (also called an outer casing tube or outer casing) and is guided telescopically in the latter in the longitudinal direction defined by way of the direction of the longitudinal axis. The casing unit and therefore the steering column can correspondingly be shortened or lengthened by telescopic pushing together or pulling apart of the casing tubes in the longitudinal direction.

Designs of casing units are known, in which one or more intermediate elements which are arranged movably in the longitudinal direction with regard to the casing tubes are arranged between the outer casing tube and the inner casing tube. In other words, the outer casing tube and the inner casing tube are situated at the front or rear end of the casing unit, or vice versa.

For example, a multiple telescopic means for an increased adjusting range can be formed from three or more casing tubes, at least one additional intermediate casing tube which can form an intermediate element of the generic type being telescopically arranged coaxially between the inner casing tube and the outer casing tube. A multiple telescopic means of this type is described in the prior art, for example in DE 10 2017 221 004 A1.

It is likewise known that a sliding unit or anti-friction bearing unit is arranged coaxially between two adjacent casing tubes. An anti-friction bearing unit of this type which is described, for example, in DE 10 2017 221 004 A1 comprises a rolling body cage which is arranged coaxially with respect to the casing tubes and in which rolling bodies such as balls or rollers are mounted which can roll between the casing tubes. As a result, a linear anti-friction bearing system is formed which makes a smooth-running adjustment and a low-play, flexurally stiff support possible. As an alternative, a linear sliding unit can be provided which is attached coaxially between the casing tubes, for example as a sliding sleeve. An anti-friction bearing unit or sliding unit of this type which can be arranged between outer, inner and/or intermediate casing tubes is likewise capable of telescoping relative to at least one casing tube, and can therefore form an intermediate element of the generic type.

Here, the rolling bodies are held between the casing tubes by way of the rolling and sliding friction, with the result that the anti-friction bearing unit is driven in the adjusting direction in the case of an adjustment of the casing tubes. As a result of slip between the rolling bodies and the casing tubes, however, the anti-friction bearing unit can slide in an undefined manner and can migrate relative to the casing tubes, with the result that, in particular after repeated adjustment of the steering column, the anti-friction bearing unit can assume different positions in the axial direction relative to the casing tubes in the same setting position of the steering column. It is disadvantageous here that the casing unit can have a different rigidity in the same setting position, depending on the position of the anti-friction bearing unit. Moreover, the required adjusting force can rise disadvantageously if the anti-friction bearing unit migrates and bears against an end stop and is stopped before an end position is reached in the case of the adjustment of the casing tubes, with the result that the rolling bodies can no longer roll during the further adjustment. In the case of a sliding unit, slipping can likewise occur relative to the casing tubes and, as a result, positioning it can become undefined.

A comparable problem can occur in the case of an intermediate casing tube of a multiple telescopic means. This intermediate casing tube is driven in the longitudinal direction by way of friction in the case of the telescoping adjustment between the outer and inner casing tube, and can move in an undefined manner in the longitudinal direction relative to the outer or inner casing tube in intermediate positions, with the result that it can assume different longitudinal positions relative to the casing tubes in the same setting position of the steering column. As a result, the rigidity of the steering column can likewise be impaired.

DE 10 2015 216 326 A1 proposes a latching apparatus, by way of which the intermediate casing tube and the inner casing can be coupled releasably to one another, in order to hold them in a predefined position with respect to one another. It is a disadvantage of this solution, however, that, in the unlatched state, the intermediate casing can be moved freely with respect to the inner casing, with the result that the casing tubes first of all have to be moved together completely, in order that the latching apparatus can be transferred into the latched state.

Thus a need exists for an improved positioning device for an intermediate element.

DETAILED DESCRIPTION

Figure 1:
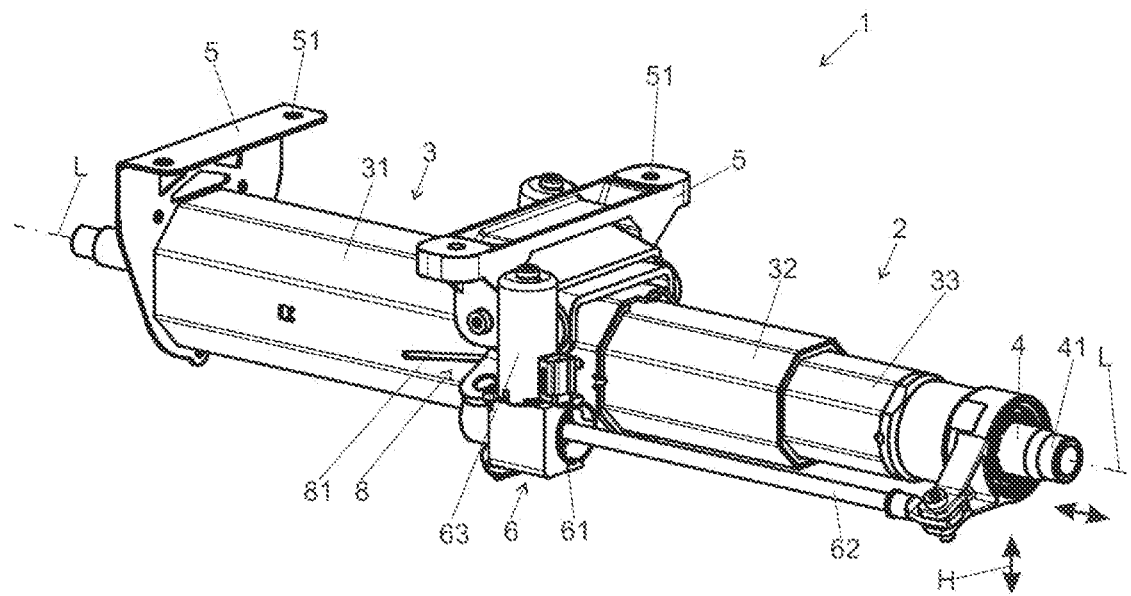
FIG. 1 is a diagrammatic perspective view of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to steering columns for motor vehicles. In some examples, a steering column may include a casing unit, in which a steering spindle is mounted such that it can be rotated about a longitudinal axis which extends in the longitudinal direction, the casing unit having at least two telescopically guided casing tubes which can be adjusted relative to one another in the longitudinal direction, an intermediate element which can be moved in the longitudinal direction being arranged between the casing tubes, and which casing unit has a positioning device for positioning the intermediate element in the longitudinal direction relative to the casing tubes.

In the case of a steering column for a motor vehicle, comprising a casing unit, in which a steering spindle is mounted such that it can be rotated about a longitudinal axis which extends in the longitudinal direction, the casing unit having at least two telescopically guided casing tubes which can be adjusted relative to one another in the longitudinal direction, an intermediate element which can be moved in the longitudinal direction being arranged between the casing tubes, and which casing unit has a positioning device for positioning the intermediate element in the longitudinal direction relative to the casing tubes, it is provided according to the invention that the positioning device comprises elongate guide tracks which are arranged on the casing tubes and the intermediate element and interact with one another in such a way that they position the casing tubes and the intermediate element relative to one another in a defined manner.

The guide tracks are configured and designed such that they form a positive guidance means which is active in the longitudinal direction between the casing tubes with regard to a relative movement, with the result that the casing tubes and the intermediate element are positioned relative to one another in the longitudinal direction in a defined manner.

The positioning device according to the invention has an arrangement of mechanical positive guidance means which interact with one another and by way of which the individual telescopic elements which comprise the casing tubes and the at least one intermediate element are positioned unambiguously relative to one another in the longitudinal direction in every adjusting state of the telescopic arrangement. In other words, the relative movement of the telescopic elements can be synchronized during pulling apart or pushing together. The elongate guide tracks can be synonymously called guide track elements or slotted guides.

A guide track can have, for example, an elongate depression opening such as, for example, a guide groove, a guide slot or the like, or, as an alternative or in addition, can have an elongate projection such as, for example, a guide web, a guide rail or guide bead or the like.

It can be provided in one advantageous development that the guide tracks run in an inclined manner relative to one another and relative to the longitudinal axis.

In a further advantageous development, at least one guide body can be guided on the guide tracks such that it positions the casing tubes and the intermediate element relative to one another in a defined manner.

The guide body is positively guided on the guide track in the direction of its longitudinal extent, with the result that a type of slotted guide can be formed, in the case of which the guide body can be moved along in a manner which is guided on or in the guide track, for example can slide along it. For example, the guide body can have a guide projection, such as a guide journal, guide pin or the like, which engages into a corresponding guide groove or a guide slot in such a way that it is held in a positively locking manner therein transversely with respect to the longitudinal extent, and can be moved along in a positively guided manner in the direction of the longitudinal extent. As an alternative or in addition, the guide body can have a depression, into which a projection of the guide track can correspondingly engage.

Each guide track on a telescopic element, that is to say a casing tube or an intermediate element, is oriented in an inclined, that is to say non-parallel, manner at a relative angle of greater than 0° and less than 180°, with regard to the longitudinal axis and with regard to a guide track on another telescopic element. Here, a guide track can have a straight or curved course. In the case of a polygonal cross section of the casing tube or intermediate element, a guide track can be arranged or configured on a substantially planar side surface, with the result that it correspondingly extends parallel to a longitudinal plane which is parallel to the longitudinal axis. In the case of a round cross section, the guide track can be of helical configuration with a lead which is defined by way of the inclination.

A positive coupling is generated between all the casing tubes and intermediate elements by virtue of the fact that the guide body engages and is guided at the same time into the corresponding guide tracks of the casing tubes and the intermediate element, that is to say is positively guided on at least three guide tracks. In this way, only limited relative positionings of the casing tubes and the intermediate elements with respect to one another are made possible which are permitted by way of the positive guidance means. Here, the coupled or synchronized movement paths are defined by way of the possible common positionings of all the positive guidance means between the telescopic elements. Unambiguous relative positioning of the casing tubes and the intermediate element is defined for each adjusting state of the casing unit in the longitudinal direction by way of the different inclination. This results in the advantage of a defined, constant rigidity of the casing unit.

It is one particular advantage of the invention that the slotted guide which is formed from guide tracks and guide body can be realized by way of low manufacturing and assembly complexity, is of simple construction and is reliable in operation.

A further advantage is that the guide tracks can be of space-saving configuration, for example as guide grooves or guide slots which can preferably be formed and integrated in one piece directly into the casing tubes. The above guide projections, webs, beads or the like can likewise be of space-saving configuration and can be integrally molded in one piece, for example by way of plastic reshaping of the walls of casing tubes and intermediate elements. As a result, the positioning device according to the invention is particularly suitable for use in a telescopic casing unit, for the defined positioning of one or more intermediate casing tubes relative to the outer and inner casing tube, and, as an alternative or in addition to the defined positioning of one or more anti-friction bearing units or sliding units relative to the casing tubes. An anti-friction bearing unit comprises a coaxial rolling body cage which encloses a casing tube entirely at least partially and in which rolling bodies are mounted rotatably or are received rotatably. A sliding unit comprises, for example, a coaxial sliding sleeve which encloses a casing tube completely or at least partially and comprises a satisfactorily slippery material, for example a plastic.

In each case at least one guide track can be arranged on each casing tube of a multiple telescopic arrangement, that is to say the outer, inner and intermediate casing tube, it also being possible for a plurality of telescoping intermediate casing tube is to be provided as intermediate elements. If rolling body or sliding units are arranged as intermediate elements between the outer and inner casing tube, they can likewise have guide tracks, even in the case of a multiple telescopic means.

A positioning device according to the invention can preferably be realized on a casing unit which has more than two telescopic intermediate elements, such as intermediate casing tubes and/or rolling body or sliding units. Thanks to the low installation space requirement which is advantageous according to the invention, synchronized positioning of two anti-friction bearing units and an intermediate casing tube which is mounted in between can take place relative to an outer and inner casing tube, that is to say a telescopic arrangement with five or more telescopic elements, for example with little complexity.

One advantageous embodiment can provide that the guide tracks have open guide slots, through which the guide body extends transversely with respect to the longitudinal axis. The guide slots can be configured with little manufacturing complexity as elongate slotted openings or apertures, continuous radially with regard to the longitudinal axis, in the wall of the casing tube or an intermediate element. A guide body which is configured as a guide pin or guide journal can be plugged through a guide slot, which guide body can slide along on the guide slot. The two slotted guides can also be coupled to one another simply by virtue of the fact that the single guide body extends through the guide slots of at least two adjacent telescopic elements. It is also possible without additional complexity that the guide body penetrates the guide slots of two, three, four or more telescopic elements, for example casing tubes and/or rolling bodies or sliding units. In this way, all the telescopic elements of a multiple telescopic arrangement can be unambiguously positioned relative to one another even by means of a compact positioning unit of simple construction, and the telescoping relative movement can be synchronized.

It can be provided that the guide body is mounted in a floating manner in the guide slots. The guide body penetrates the guide slots of two, three or more telescopic elements which include casing tubes and intermediate elements. The guide body is held in each guide slot in the slot opening such that it can be moved along the extent. In this way, the guide body connects the telescopic elements, but can be moved in the process with regard to each individual telescopic element, that is to say is mounted in a floating manner. The guide body can comprise, for example, a guide pin or guide journal which penetrates the guide slots and, at its ends which project inward out of the inner casing tube and outward out of the outer casing tube, has a head or the like which projects beyond the width of the guide slot and, as a result, is held in the guide slots and is secured against falling out. The head can be produced, for example, by way of riveting, beading or other cold working methods. An arrangement of this type can advantageously be realized with small dimensions and in a simple and reliable manner in terms of manufacturing and assembly.

It can be provided that the guide tracks intersect in an overlap portion, the guide body being arranged in the overlap portion. The guide tracks which are inclined to different extents according to the invention cross on the course in an overlap portion which is arranged in a defined manner in the longitudinal direction in the manner which is dependent on the adjusting state with regard to each of the telescopic elements. The relative positioning is also defined unambiguously by virtue of the fact that the guide body unambiguously determines the position of the overlap portion relative to each telescopic element. This arrangement can be realized particularly simply, compactly and reliably by virtue of the fact that the guide tracks are configured as guide slots which overlap in the overlap region in such a way that an open region is formed which is continuous through all the telescopic elements which are guided on one another, namely the casing tubes and intermediate elements. The guide body is guided there through all the guide slots, and is mounted in the guide slots in a floating manner, with the result that positive the coupling of all the telescopic elements is produced.

It can be advantageous that the guide body penetrates three, four or more guide slots and is mounted therein in a floating manner. As a result, a correspondingly large number of casing tubes and intermediate elements can be positioned unambiguously relative to one another in a spatially compact manner and with little complexity, and the telescoping movement can be synchronized.

It can be provided that the guide body is held on a casing tube or an intermediate element such that it cannot be moved in the longitudinal direction. In this case the guide body can preferably be moved transversely with respect to the longitudinal direction. The telescopic arrangement, on which the guide body cannot be moved in the longitudinal direction, remains, as it were, in the center position in the case of a telescopic adjustment of the remaining telescopic elements. The guide body can be mounted, for example as a guide pin or journal, movably in a guide slot which is perpendicular relative to the longitudinal direction.

One advantageous embodiment can provide that at least two guide tracks are arranged distributed over the circumference, and are preferably distributed uniformly. For example, guide tracks which are configured as guide slots can be made in the walls of casing tubes and intermediate elements so as to lie opposite one another with regard to the longitudinal axis. As a result, the telescopic elements are held and guided symmetrically, and inhomogeneous loading, tilting or the like are prevented.

A steering column according to the invention can have at least two, preferably three telescopic casing tubes, it being possible for rolling body or sliding units to be inserted between the casing tubes. In the case of a multiple telescopic means of this type, a particularly great adjusting ratio can be realized between the maximum pushed-together adjusting position and the maximum moved-apart adjusting position, as is advantageous, for example, in the case of stowable steering columns for autonomous driving operation. The positioning of all the casing tubes and intermediate elements can be synchronized by way of the positioning device according to the invention.

A motorized adjusting drive can be provided in order to adjust the steering column, which adjusting drive is coupled to the casing tubes, in order to adjust the casing tubes relative to one another at least in the longitudinal direction. The inner casing tube can be capable of being retracted and extended in the longitudinal direction relative to the outer casing tube by the motorized adjusting drive. The adjusting drive can comprise a spindle drive, with a spindle nut which is arranged on a threaded spindle, and with a drive motor, by which the threaded spindle and the spindle nut can be driven rotationally relative to one another. Adjusting drives of this type are known in principle in the prior art and are considered to be reliable and robust. Here, the spindle nut is attached to the one casing tube, the inner or outer casing tube, such that it cannot be displaced in the direction of the longitudinal axis, and the threaded spindle is attached to the other casing tube, the outer or inner casing tube, which can telescope with respect to the one casing tube. The spindle nut or the threaded spindle is driven rotationally by an electric actuating motor via a suitable mechanism, for example a worm or belt mechanism, as a result of which the threaded spindle or spindle nut which is fixed relative thereto with regard to the rotation is moved translationally in the direction of the spindle longitudinal axis, and the inner casing tube retracts or extends in the axial direction relative to the outer casing tube depending on the relative rotational direction.

The casing unit with the steering spindle which is mounted therein forms an actuating unit. The actuating unit can be held in a mounting unit which can be connected to a vehicle body. It can be provided here that the actuating unit is mounted on the mounting unit such that it can be pivoted vertically about a pivot axis which lies transversely with respect to the longitudinal axis, that is to say orthogonally with respect to the axial direction. A height adjustment can be realized by way of the pivoting about a horizontal pivot axis of this type, in the case of which height adjustment the height of the steering wheel which is attached to the rear end of the steering spindle can be set relative to the driver's position.

The height adjustment can take place manually. For automated stowing of the steering column in the case of autonomous driving, in particular, it is advantageous that an electric height adjusting drive is connected to the mounting unit and the actuating unit, by which electric height adjusting drive the actuating unit can be moved about the pivot axis relative to the mounting unit. The height adjusting drive is likewise known per se and can be realized, for example, as a spindle drive which is driven by electric motor, as described above for the longitudinal adjustment.

The invention relates, furthermore, to a steering column for a motor vehicle, comprising a casing unit, in which a steering spindle is mounted such can be rotated about a longitudinal axis which extends in the longitudinal direction, the casing unit having at least two telescopically guided casing tubes which can be adjusted relative to one another in the longitudinal direction, at least one intermediate element which can be moved in the longitudinal direction being arranged between the casing tubes, and comprising a position detection device for detecting the relative position of the casing tubes. Furthermore, the invention relates to a method for measuring the adjusting state of the steering column for a motor vehicle.

An automated motorized adjustment of the steering column on the basis of individual steering wheel position data can be made possible by virtue of the fact that the position of the steering wheel in the vehicle interior compartment is determined on the basis of the adjusting state of the steering column and is stored. To this end, it is known from DE 10 2019 108 466 A1, for example, for the longitudinal setting of the steering column to be detected by virtue of the fact that the relative position of the outer and inner casing tube is measured by means of a position detection device, and the current length of the casing unit is determined therefrom. The length of the casing unit can be measured electrically as a length measured value and can be stored by virtue of the fact that suitable electric position sensors are attached to the outer and inner casing tube. If required, the steering column can preferably be adjusted in an automated motorized manner into the stored position. High driving comfort can be realized as a result, in order, in the case of entry or exit or else in the case of autonomous driving, to automatically selectively stow the steering column or move it into an ergonomic operating position.

The measurement of the relative position of the outer and inner casing tube is awkward and complicated, in particular, in the case of multiple telescoping steering columns with a relatively great adjusting travel and one or more intermediate elements which are arranged telescopically between the outer and inner casing tube.

Thus the present disclosure makes improved position detection possible in the case of a multiple telescoping steering column.

In the case of a steering column for a motor vehicle, comprising a casing unit, in which a steering spindle is mounted such can be rotated about a longitudinal axis which extends in the longitudinal direction, the casing unit having at least two telescopically guided casing tubes which can be adjusted relative to one another in the longitudinal direction, at least one intermediate element which can be moved in the longitudinal direction being arranged between the casing tubes, and comprising a position detection device for detecting the relative position of the casing tubes, it is provided according to the invention that a positioning device is arranged on the casing tubes and the intermediate element and interacts with them in such a way that the casing tubes and the intermediate element are positioned relative to one another in a defined manner, it being possible for the relative position of the intermediate element with respect to casing tube or a further intermediate element to be detected by the position detection device.

According to the invention, the steering column has a positioning device which is synonymously called a synchronizing device, with which the position detection device interacts. By way of the positioning device, the casing tubes and the intermediate element or elements are synchronized with one another with regard to their relative telescopic movement in the longitudinal direction, that is to say are positively coupled, preferably mechanically. In the case of a relative positioning of the casing tubes, that is to say, in particular, of the outer casing tube at the one end of the casing unit relative to the inner casing tube at the other end of the casing unit, positive positioning, that is to say positively guided positioning of the intermediate element or the intermediate elements, takes place, that is to say an unambiguously defined relative positioning of the intermediate element or elements in the longitudinal direction relative to the casing tubes or, if present, relative to a further intermediate element.

The position detection device is not (as in the prior art) attached exclusively to the casing tubes, that is to say to the outer and inner casing tube, but preferably interacts directly with the intermediate element. As a result, the position detection device supplies a position measured value which specifies the position of the intermediate element in the longitudinal direction relative to casing tube, that is to say the outer or inner casing tube, or, if at least two or more intermediate elements are present, relative to a further intermediate element.

By virtue of the fact that the intermediate element is always positioned unambiguously relative to the casing tubes via the positively guided positioning device, the relative positioning of the outer and inner casing tube can be determined and unambiguously from said position measured value, which relative position is correlated unambiguously with the length measured value which specifies the length setting of the casing unit and therefore of the steering column.

The relative positioning of the casing tubes can be calculated simply from the position measured value with consideration of the transmission ratio of the positioning device, which transmission ratio specifies the ratio of the movement of the intermediate element relative to the movement of the casing tubes, from the positioning of the intermediate element, and the length measured value which specifies the length adjustment of the steering column can thus be determined. To this end, the positioning device can have an electronic evaluation device or can be connected to an electronic evaluation device of this type which, starting from the positioned measured value, calculates and outputs the length measured value which can be fed to a further evaluation and processing means. The evaluation device can preferably be configured and set up to determine the relative position of the casing tubes from the measured relative position of the intermediate element.

It is one advantage of the invention that the position of the intermediate element relative to a casing tube or a further intermediate element moves merely by a fraction of the overall adjustment of the outer and inner casing tube, which fraction is determined by way of the transmission ratio of the positioning device. For example, the intermediate element is always situated centrally between the end-side casing tubes in the case of a transmission ratio of 2:1, with the result that it is moved at most by half the overall adjustment during adjustment. As a result, the measurement range of the position detection device in the longitudinal direction can be smaller than in the prior art, as a result of which a compact and inexpensive embodiment is made possible.

It is a further advantage that the position detection device does not have to act (as in the prior art) on the casing tube which can be adjusted into the vehicle interior compartment and to which the steering input means is attached. A body-side attachment which is optimized in terms of installation space between the casing tube which is situated there and the intermediate element is advantageously made possible, with the result that the position detection device protrudes into the vehicle interior compartment to a lesser extent and takes up less installation space.

It can preferably be provided that the position detection device has sensor elements which correspond with one another and are arranged on the intermediate element and a casing tube or a further intermediate element. Sensor elements can preferably be used which output absolute position measured values or length measured values as measured values which correspond with the positioning of the intermediate element with respect to the casing tube or further element, to which reference is made according to the invention, that is to say specify the spacing in the longitudinal direction. As an alternative, incremental encoders or relative measured value encoders of the like can be used which detect a relative adjustment.

The sensor elements can preferably be of capacitive, inductive or resistive configuration. Contactless electric measuring methods can preferably be used. Advantages are a high robustness and measuring accuracy, a simple integration into electronic measuring and evaluation systems, and a small overall design. Sensor elements of this type are commercially available, and comprise, for example, elongate, strip-shaped or rail-shaped measured value transducers and measuring pickups which correspond with them and output absolute or relative length measured values in a manner which is dependent on the relative arrangement in the longitudinal direction. Sensors of this type can be attached in a structurally simple manner to an intermediate element and a casing tube, and can be integrated into a casing unit. As an alternative, the use of optical or acoustic sensors or sensors which operate in accordance with other measuring principles is also conceivable.

It can be provided that a first sensor element is arranged on the inside on a casing tube or intermediate element, and a second sensor element which corresponds with it is arranged, in a manner which is assigned to the first sensor element, on the outside on a casing tube or intermediate element which is adjacent in the telescopic arrangement. As a result, an advantageous compact overall design can be realized. Moreover, the sensor elements can be integrated into the casing unit in a protected manner.

The intermediate elements can comprise telescopic elements, for example at least one intermediate casing tube, and, in addition or as an alternative, also at least one bearing unit which is arranged such that it can be moved in the longitudinal direction between two casing tubes, for example a telescopic anti-friction bearing unit or sliding unit.

The intermediate elements can preferably be of tubular configuration with a round or non-round profile cross section. A non-round profile cross section can be, for example, of triangular, square, hexagonal octagonal or polygonal configuration. In the case of a polygonal profile of this type, a sensor element according to the invention can preferably be arranged in the region of a side wall which extends in a planar manner and is substantially flat. As a result, a structural integration of simple construction is made possible. Moreover, an unambiguous and secure orientation with regard to the longitudinal axis is ensured, since the non-round cross section is already secured without further measures in a positively locking manner against rotation.

It can be provided that the position detection device has a third sensor element and a fourth sensor element which interacts with the former. Thanks to a configuration of this type, the position detection device can be of redundant configuration, with the result that the safety against the failure of the position detection device is reduced.

It can be provided in a further advantageous development that the first sensor element and second sensor element have a different measuring method with respect to the third sensor element and the fourth sensor element; in other words, they have measuring methods which differ from one another and are based on different measuring principles. As a result, the safety against a failure can be increased further.

A motorized adjusting drive can preferably be provided for adjusting the steering column, which motorized adjusting drive acts on the casing tubes, preferably on the inner and outer casing tube, or on one casing tube and one intermediate element or on two intermediate elements, in order to adjust the casing tubes relative to one another in the longitudinal direction. The inner casing tube can be capable of being retracted and extended in the longitudinal direction relative to the outer casing tube by the motorized adjusting drive.

An adjusting drive can comprise a spindle drive, with a spindle nut which is arranged on a threaded spindle, and with a drive motor, by which the threaded spindle and the spindle nut can be driven rotationally relative to one another. Adjusting drives of this type are well known in the prior art and are considered to be reliable and robust. Here, the spindle nut is attached such that it cannot be displaced in the direction of the longitudinal axis to the one casing tube, the inner or outer casing tube, and the threaded spindle is attached to the other casing tube which can telescope with respect thereto, the outer or inner casing tube. As an alternative, the spindle drive can also act on intermediate elements which are positively coupled to the casing tubes. The spindle nut or the threaded spindle is driven rotationally by an electric actuating motor via a suitable mechanism, for example a worm or belt mechanism, as a result of which the spindle nut or threaded spindle which is stationary relative thereto with regard to the rotation is moved translationally in the direction of the spindle longitudinal axis, and retracts or extends the inner casing tube relative to the outer casing tube in the axial direction depending on the relative rotational direction.

The adjustment of the adjusting drive can also be detected by means of the position detection device according to the invention, which adjustment corresponds to the adjustment of the telescopic elements which are connected thereto. For example, the position detection device can be arranged on the adjusting drive or can be configured such that it is integrated with the latter.

In one advantageous development, the position detection device can be integrated into a control unit, the control unit being configured for actuating the adjusting drive.

Together with the steering spindle which is mounted therein, the casing unit forms an actuating unit. The latter can be held in a mounting unit which can be connected to a vehicle body. It can be provided here that the actuating unit is mounted on the mounting unit such that it can be pivoted vertically about a pivot axis which lies transversely with respect to the longitudinal axis, that is to say orthogonally with respect to the axial direction. A height adjustment can be realized by way of the pivoting about a horizontal pivot axis of this type, in the case of which height adjustment the height of the steering wheel which is attached to the rear end of the steering spindle can be set relative to the driver's position.

The height adjustment can take place manually. It is advantageous, in particular for automated stowage of the steering column in the case of autonomous driving, that an electric height adjusting drive is connected to the mounting unit and the actuating unit, by which electric height adjusting drive the actuating unit can be moved relative to the mounting unit about the pivot axis. A height adjusting drive is likewise known per se and can be realized, for example, as a spindle drive which is driven by electric motor, as described above for the longitudinal adjustment.

Furthermore, the invention relates to a method for measuring the adjusting state of a steering column for a motor vehicle, comprising a casing unit, in which a steering spindle is mounted such that it can be rotated about a longitudinal axis which extends in the longitudinal direction, the casing unit having at least two telescopically guided casing tubes which can be adjusted relative to one another in the longitudinal direction, at least one intermediate element which can be moved in the longitudinal direction being arranged between the casing tubes, a length measured value which is correlated with the adjusting state being determined from the relative position of the casing tubes, in the case of which method it is provided according to the invention that the casing tubes and the intermediate element are positioned relative to one another in a defined manner, and that the relative position of the intermediate element with respect to casing tube or a further intermediate element is measured by the position detection device as position measured value, and that a length measured value is calculated from the measured position measured value.

As explained above with respect to the steering column according to the invention, the casing tubes and the intermediate element or elements are positively coupled in the longitudinal direction. The steering column can preferably have a positioning device, by way of which the casing tubes and the intermediate element are positioned relative to one another in a defined and positively coupled manner.

The position measured value can be measured by way of a position detection device of the steering column, as described above for the steering column according to the invention.

The position measured value can preferably be input into an evaluation unit, that is to say can be transmitted to the latter, which evaluation unit calculates and outputs a length measured value from the measured position measured value. The calculation can take place as described above with consideration of the transmission ratio of the positioning device.

The adjustment of the steering column can preferably take place by means of a motorized adjusting drive. Here, the adjusting drive can be actuated via a control unit which is connected to the evaluation unit, in such a way that the steering column is set into a defined adjusting state in an automated manner on the basis of a length measured value.

It can be provided in one advantageous development that the position which is determined by way of the position detection device is compared with a position which is determined from determined parameters of the adjusting drive, for example adjustment-dependent measured incremental steps, Hall counts, or the like. In the case of a deviation of the determined positions from one another, the output of an error message can take place.

In the case of a steering column for a motor vehicle, comprising a casing unit, in which a steering spindle is mounted such that it can be rotated about a longitudinal axis which extends in the longitudinal direction, the casing unit having at least two telescopically guided casing tubes which can be adjusted relative to one another in the longitudinal direction, an intermediate element which can be moved in the longitudinal direction being arranged between the casing tubes, and which casing unit has a positioning device for positioning the intermediate element relative to the casing tubes in the longitudinal direction, it can be provided that the positioning device comprises elongate guide tracks which are arranged on the casing tubes and the intermediate element and interact with one another in such a way that they position the casing tubes and the intermediate element relative to one another in a defined manner.

The guide tracks are set up and configured such that they form a positive guide which is active between the casing tubes with regard to a relative movement in the longitudinal direction, with the result that the casing tubes and the intermediate element are positioned relative to one another in the longitudinal direction in a defined manner, that is to say are moved in a synchronized manner.

The positioning device according to the invention has an arrangement of mechanical positive guides which interact with one another and by way of which the individual telescopic elements which comprise the casing tubes and the at least one intermediate element are positioned unambiguously relative to one another in the longitudinal direction in every adjusting state of the telescopic arrangement. In other words, the relative movement of the telescopic elements can be synchronized during pulling apart or pushing together. The elongate guide tracks can synonymously be called guide track elements or slotted guides.

A guide track can have, for example, an elongate depression or opening such as, for example, a guide groove, a guide slot or the like, or can have, as an alternative or in addition, an elongate projection such as, for example, a guide web, a guide rail or guide bead or the like.

It can be provided in one advantageous development that the guide tracks run in an inclined manner relative to one another and relative to the longitudinal axis.

In a further advantageous development, at least one guide body can be guided on the guide tracks such that it positions the casing tubes and the intermediate element relative to one another in a defined manner.

The guide body is positively guided on the guide track in the direction of its longitudinal extent, with the result that a type of slotted guide can be formed, in the case of which the guide body can be moved along in a manner which is guided on or in the guide track, for example can slide along the guide track. For example, the guide body can have a guide projection such as a guide journal, pin or the like which engages into a corresponding guide groove or a guide slot in such a way that it is held therein in a positively locking manner transversely with respect to the longitudinal extent, and can be moved along in the direction of the longitudinal extent in a positively guided manner. As an alternative or in addition, the guide body can have a depression, into which a projection of the guide track can correspondingly engage.

Each guide track on a telescopic element, that is to say a casing tube or an intermediate element, is oriented in an inclined, that is to say non-parallel, manner at a relative angle of greater than 0° and less than 180° with regard to the longitudinal axis and with regard to a guide track on another telescopic element. Here, a guide track can have a straight or curved course. In the case of a polygonal cross section of the casing tube or intermediate element, a guide track can be arranged or configured on a substantially flat side surface, with the result that it correspondingly extends parallel to a longitudinal plane which is parallel to the longitudinal axis. In the case of a round cross section, the guide track can be of helical configuration with a lead which is defined by way of the inclination.

A positive coupling is generated between all the casing tubes and the intermediate elements by virtue of the fact that the guide body engages and is guided at the same time into/in the corresponding guide tracks of the casing tubes and the intermediate element, that is to say is positively guided on at least three guide tracks. In this way, only limited relative positioning is of the casing tubes and the intermediate element with respect to one another are made possible, which positioning is are permitted by way of the positive guide. Here, the coupled or synchronized movement paths are defined by way of the possible common positionings of all the intermediate guides between the telescopic elements. An unambiguous relative positioning of the casing tubes and the intermediate element is defined by way of the different inclination for each adjusting state of the casing unit in the longitudinal direction. This results in the advantage of a defined, constant rigidity of the casing unit.

It is one particular advantage of the invention that the slotted guide which is formed from guide tracks and guide body can be realized with little manufacturing and assembly complexity, is of simple construction and is reliable during operation.

It is a further advantage that the guide tracks can be of space-saving configuration, for example as guide grooves or guide slots which can preferably be shaped and integrated directly into the casing tubes in a single-piece manner. Projecting guide projections, webs, beads or the like can likewise be of space-saving configuration and can be integrally formed in one piece, for example by way of plastic reshaping of the walls of casing tubes and intermediate elements. As a result, the positioning device according to the invention is particularly suitable for use in a telescopic casing unit, for defined positioning of one or more intermediate casing tubes relative to the outer and inner casing tube, and, as an alternative or in addition, for defined positioning of one or more anti-friction bearing units or sliding units relative to the casing tubes. An anti-friction bearing unit can comprise a coaxial rolling body cage which encloses a casing tube completely or at least partially and in which rolling bodies are mounted rotatably or are received rotatably. A sliding unit comprises, for example, a coaxial sliding sleeve which encloses a casing tube completely or at least partially and comprises a satisfactorily slidable material, for example a plastic.

In each case at least one guide track can be arranged on each casing tube of a multiple telescopic means arrangement, that is to say the outer, inner and intermediate casing tube, it also being possible for a plurality of telescopic intermediate casing tubes to be provided as intermediate elements. If rolling body units or sliding units are arranged as intermediate elements between the outer and inner casing tube, they can likewise have guide tracks, even in the case of a multiple telescopic means.

A positioning device according to the invention can preferably be realized on a casing unit which has more than two telescopic intermediate elements, such as intermediate casing tubes and/or rolling body units or sliding units. Thanks to the advantageous low installation space requirement according to the invention, synchronized positioning of two anti-friction bearing units and an intermediate casing tube which is mounted in between relative to an outer and inner casing tube can take place with lithe complexity, for example, that is to say of a telescopic arrangement with five or more telescopic elements.

One advantageous embodiment can provide that the guide tracks have open guide slots, through which the guide body extends transversely with respect to the longitudinal axis. The guide slots can be configured with a low manufacturing complexity as elongate slotted openings or slotted apertures, which are continuous radially with regard to the longitudinal axis, in the wall of the casing tube or an intermediate element. A guide body which is configured as a guide pin or guide journal and can slide along in a guide slot can be plugged through the guide slot. The two slotted guides can be coupled to one another simply by virtue of the fact that the single guide body extends through the guide slots of at least two adjacent telescopic elements. It is also possible without additional complexity that the guide body penetrates the guide slots of two, three, four or more telescopic elements, for example casing tubes and/or rolling bodies or sliding units. In this way, all the telescopic elements of a multiple telescopic arrangement can be positioned relative to one another unambiguously and the telescopic relative movement can be synchronized even by means of a compact positioning unit of simple construction.

It can be provided that the guide body is mounted in a floating manner in the guide slots. The guide body penetrates the guide slots of two, three or more telescopic elements which include casing tubes and intermediate elements. The guide body is held in every guide slot in the slot opening such that it can be moved along the extent. In this way, the guide body connects the telescopic elements, but is mounted here such that it can be moved with regard to each individual telescopic element, that is to say is mounted in a floating manner. The guide body can comprise, for example, a guide pin or guide journal which penetrates the guide slots, has a head or the like which projects beyond the width of the guide slot at its ends which project inward out of the inner casing tube and outward out of the outer casing tube, and is held as a result in the guide slots and is secured against falling out. The head can be produced, for example, by way of riveting, beading or other cold working methods. An arrangement of this type can advantageously be realized with small dimensions and simply and reliably in terms of manufacturing and assembly.

It can be provided that the guide tracks intersect in an overlap portion, the guide body being arranged in the overlap portion. The guide tracks which are inclined to different extents according to the invention overlap in terms of their course in an overlap portion which is arranged in a defined manner in the longitudinal direction in a manner which is dependent on the adjusting state with regard to each of the telescopic elements. The relative positioning is also defined unambiguously by virtue of the fact that the guide body unambiguously determines the position of the overlap portion relative to each telescopic element. This arrangement can be realized particularly simply, compactly and reliably by virtue of the fact that the guide tracks are configured as guide slots which overlap in the overlap region in such a way that an open region which passes through all the telescopic elements which are guided on one another, namely casing tubes and intermediate tubes, is formed. The guide body is guided there through all the guide slots, and is mounted in a floating manner in the guide slots, with the result that positive coupling of all the telescopic elements is produced.

It can be advantageous that the guide body penetrates two, three or more guide slots and is mounted in a floating manner therein. As a result, a correspondingly large number of casing tubes and intermediate elements can be unambiguously positioned relative to one another in a spatially compact manner and with low complexity, and the telescoping movement can be synchronized.

It can be provided that the guide body is held on a casing tube or an intermediate element such that it cannot be moved in the longitudinal direction. It is preferably possible here that the guide body is mounted such that it can be moved transversely with respect to the longitudinal direction. The telescopic element, on which the guide body cannot be moved in the longitudinal direction, remains as it were in the middle position in the case of a telescopic adjustment of the remaining telescopic elements. The guide body can be mounted, for example, as a guide pin or guide journal movably in a guide slot which is perpendicular relative to the longitudinal direction.

One advantageous embodiment can provide that at least two guide tracks are arranged distributed over the circumference, preferably distributed uniformly. For example, guide tracks which are configured as guide slots can be made in the walls of casing tubes and intermediate element such that they lie opposite one another with regard to the longitudinal axis. As a result, the telescopic elements are held and guided symmetrically, and inhomogeneous loading, tilting and the like are prevented.

A steering column according to the invention can have at least two, preferably three telescopic casing tubes, it being possible for rolling body units or sliding units to be inserted between the casing tubes. In the case of a multiple telescopic means of this type, a particularly great adjusting ratio can be realized between the maximum pushed-together and the maximum pulled-apart adjusting position, as is advantageous, for example, in the case of stowable steering columns for autonomous driving operation. The positioning of all the casing tubes and intermediate elements can be synchronized by way of the positioning device according to the invention.

It is possible to combine all the above-described features of a steering column according to the invention, in the case of which it is provided that the positioning device comprises elongate guide tracks which are arranged on the casing tubes and the intermediate element and interact with one another in such a way that they position the casing tubes and the intermediate element relative to one another in a defined manner, with all the above-described features of the steering column, in the case of which it is provided that a positioning device is arranged on the casing tubes and the intermediate element and interact with them in such a way that the casing tubes and the intermediate element are positioned relative to one another in a defined manner, it being possible for the relative position of the intermediate element with respect to casing tube or a further intermediate element to be detected by the position detection device. In other words, combinations of guide tracks and position detection devices are conceivable and possible.

FIG. 1 shows a steering column 1 according to the invention in a view with regard to the driving direction from obliquely behind, which steering column 1 has an actuating unit 2. The actuating unit 2 comprises a casing unit 3 which has an outer casing tube 31, an intermediate casing tube 32 and an inner casing tube 33 which are denoted in their entirety as casing tubes 31, 32 and 33. They are arranged coaxially inside each other such that they can be displaced telescopically in the longitudinal direction which corresponds to the axial direction of a longitudinal axis L, as indicated by way of the double arrow, Here, the intermediate casing tube 32 forms an intermediate element in the sense of the invention.

A steering spindle 4 is mounted in the casing unit 3 such that it can be rotated about the longitudinal axis L, which steering spindle 4 has, at its rear end, a connection portion 41 for attaching a steering wheel (not shown).

The casing unit 3 is held in a two-part mounting unit 5 which has fastening means 51 in the form of openings for attaching to a vehicle body (not shown).

An adjusting drive 6 has a spindle drive with a spindle nut 61 and a threaded spindle 62 which is screwed into it, which spindle nut 61 and threaded spindle 62 can be driven rotationally relative to one another by an electric motor 63. The threaded spindle 62 extends parallel to the longitudinal axis L and is connected to the inner casing tube 33, and the spindle nut 61 is supported on the outer casing tube 31 via the adjusting drive 6 in the longitudinal direction which corresponds to the axial direction of the longitudinal axis L. The threaded spindle 62 and the spindle nut 61 are moved together or apart from one another by way of a relative rotation by means of the motor 63, depending on the rotational direction, as a result of which the inner casing tube 33 is retracted into or extended from the outer casing tube 31 in the axial direction of the longitudinal axis L, as indicated by way of the double arrow. As a result, a longitudinal adjustment is realized, by way of which a steering wheel which is attached to the connector portion 41 can be moved forward into a stowage position, in which the inner casing tube 33 and the intermediate casing tube 32 are moved in the outer casing tube 31, that is to say are lowered toward the front, or into an operating position in the operating region, in which operating position the casing tubes 31, 32 and 33 are moved apart from one another.

As an alternative, the spindle nut 61 can be supported on the inner casing tube 33, and the threaded spindle 62 can be supported on the outer casing tube 31.

Figure 2:
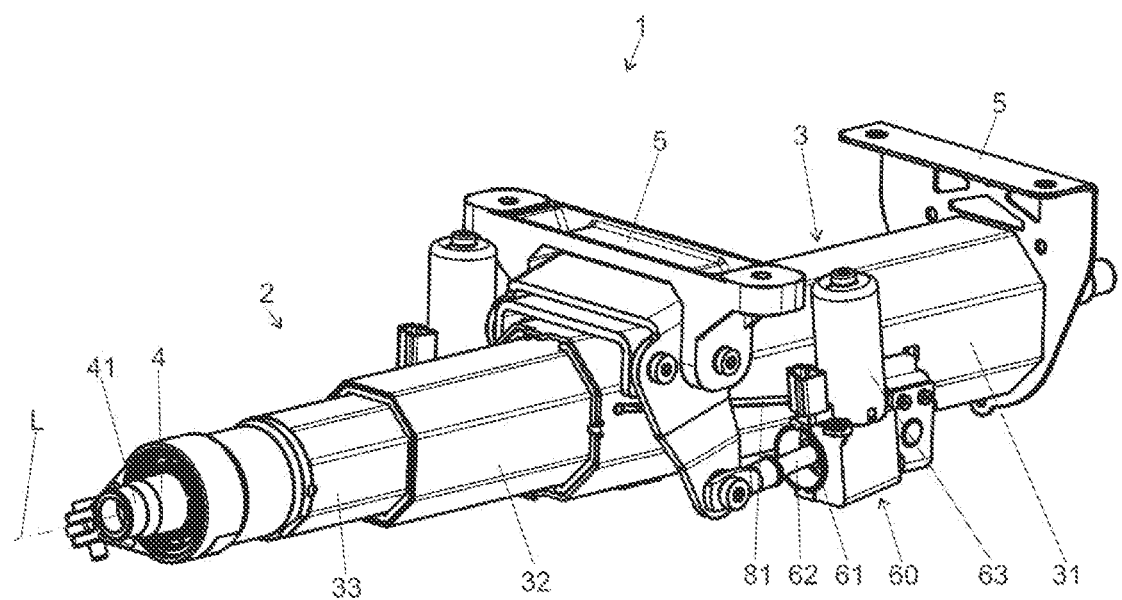
FIG. 2 is another perspective view of the steering column according to FIG. 1.

FIG. 1 shows an adjusting position of the steering column 1 in an operating position, in the case of which the intermediate casing tube 32 and the inner casing tube 33 are moved at least partially out of the outer casing tube 31 in the longitudinal direction rearward in relation to the driving direction of the motor vehicle (to the right in the drawing), with the result that a steering wheel which is attached to the connector portion 41 is situated in the operating region in order to input steering commands. FIG. 2 shows the same adjusting state, the inner casing tube being pulled out to the left as a result of the different perspective.

Figure 3:
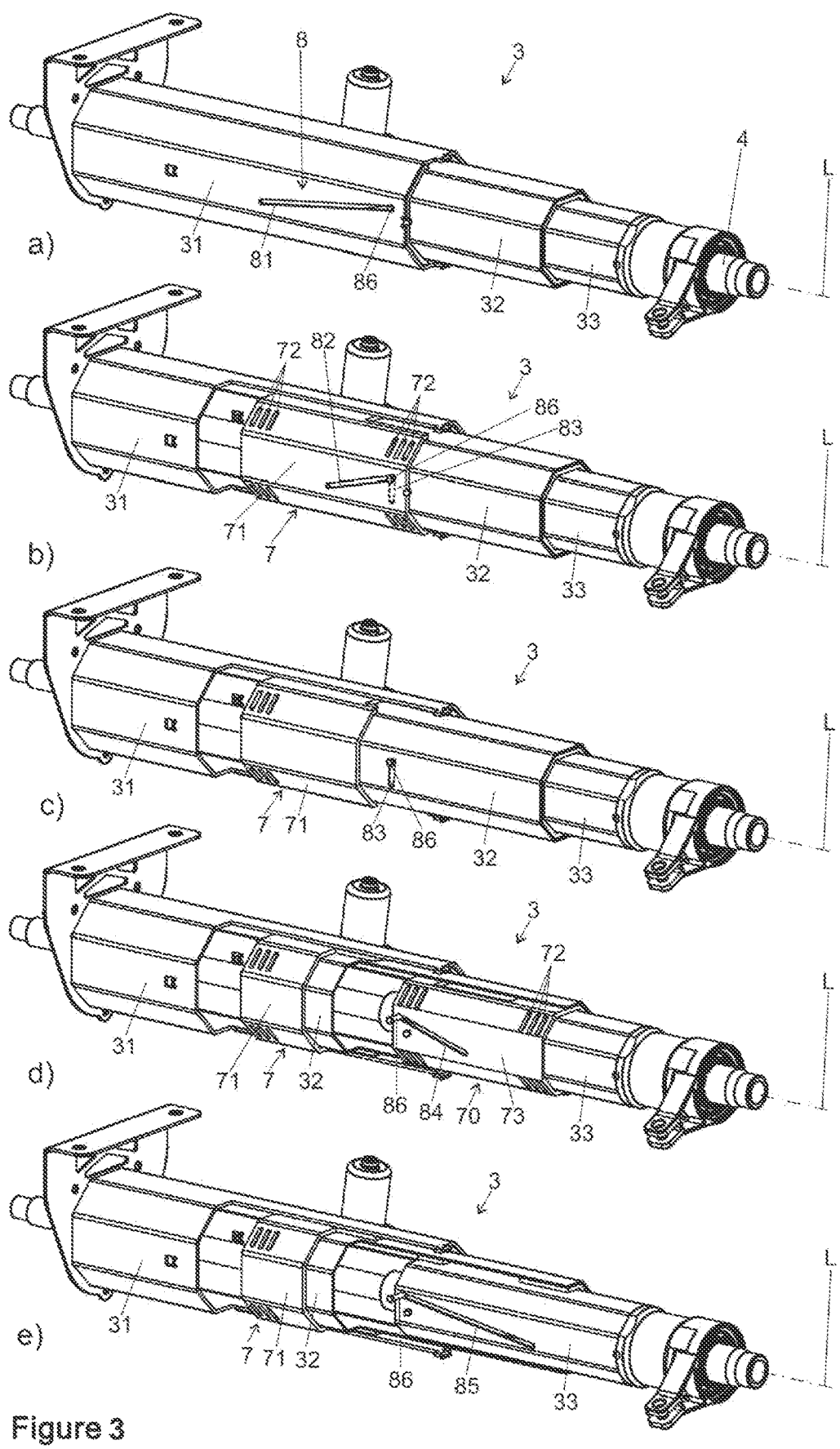
FIGS. 3a-e are diagrammatic cutaway views of the steering column according to FIG. 1.
Figure 4:
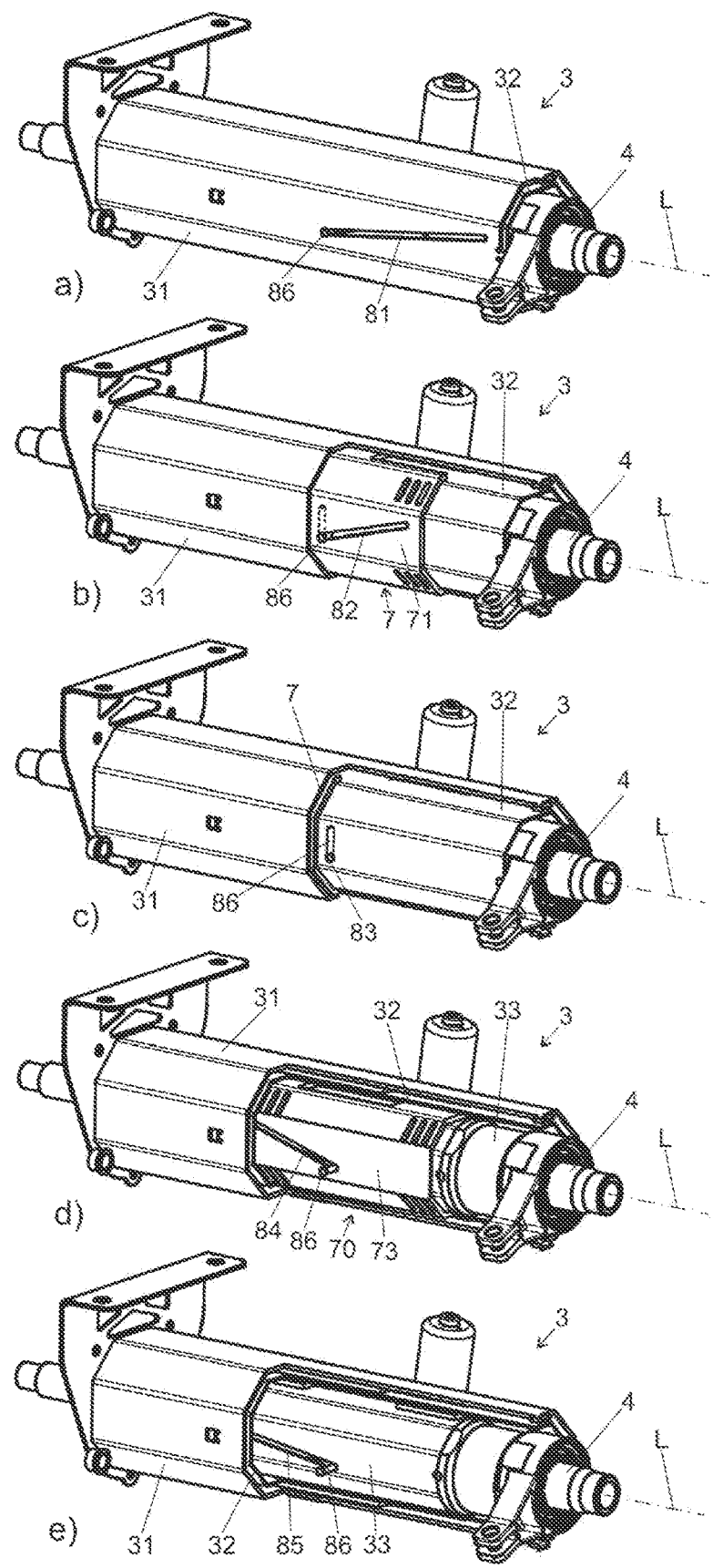
FIGS. 4a-e are diagrammatic cutaway views of a steering column in a moved-together adjusting state.

FIG. 3 shows the casing unit 3 individually for improved clarity, in perspective and in the adjusting state according to FIG. 1. Individual part portions of the casing tubes 31, 32, 33 are cutaway and omitted in the individual part FIGS. 3a, b, c, d and e, and in each case expose a further view into the interior of the casing unit 3.

In FIG. 3b, the outer casing tube 31 is partially omitted. It can be seen therein that an anti-friction bearing unit 7 is arranged coaxially between the casing tubes 31 and 32, which anti-friction bearing unit 7 can be moved telescopically in the longitudinal direction relative thereto and represents an intermediate element in the sense of the invention. The anti-friction bearing unit 7 has a sleeve-shaped rolling body cage 71 which, in the example which is shown, is configured as a roller cage, in which a plurality of rollers 72 are in each case held rotatably, as rolling bodies, positioned in each case in rows which are axially parallel to the longitudinal axis L. The rollers 72 roll on the outside on the outer casing tube 31, that is to say on an inner surface of the outer casing tube 31, and on the inside on the intermediate casing tube 32, that is to say on an outer surface of the intermediate casing tube 32, with the result that a linear anti-friction bearing system is formed in the longitudinal direction between the casing tubes 31 and 32.

In FIG. 3c, the anti-friction bearing unit 7 is partially cut away and omitted, and exposes a view of the outer side, concealed by the rolling body cage 71 in FIG. 3b, of the intermediate casing tube 32 with the guide slot 83.

In FIG. 3d, the intermediate casing tube 32 is partially omitted. It can be seen therein that a second anti-friction bearing unit 70 is arranged coaxially between the intermediate casing tube 32 and the inner casing tube 33, which second anti-friction bearing unit 70 is in principle configured like the anti-friction bearing unit 7 and, in the sense of the invention, represent an intermediate element which can be moved telescopically in the longitudinal direction relative to the casing tubes 32 and 33. The anti-friction bearing unit 70 has a sleeve-shaped rolling body cage 73, in which a plurality of rollers 7 are in each case held rotatably as rolling bodies, positioned in each case in rows which are axially parallel to the longitudinal axis L. The rollers 72 roll on the outside on the intermediate casing tube 32, that is to say on an inner surface of the intermediate casing tube 32, and on the inside on the inner casing tube 33, that is to say on an outer surface of the inner casing tube 33, with the result that the linear anti-friction bearing system is formed in the longitudinal direction between the casing tubes 32 and 33.

In FIG. 3e, the anti-friction bearing unit 70 is partially omitted and exposes a view of the outer side, concealed by the rolling body cage 73 in FIG. 3d, of the inner casing tube 33.

FIGS. 4a to 4e show the casing unit 3 and the same perspective as in FIGS. 3a to 3e in the moved-together adjusting state which corresponds to the stowage position, in which the inner casing tube 33 dips to a maximum extent (to the left in the drawing) into the intermediate casing tube 32, and the latter is lowered in the outer casing tube 31. As a result, the casing unit 3 and therefore the steering column 1 are shortened in the longitudinal direction to a maximum extent, with the result that the steering wheel can be stowed outside the operating region, for example during autonomous driving operation.

In the case of the telescopic retraction out of the operating position which is shown in FIGS. 3a-3e into the stowage position which is shown in FIGS. 4a-4e, the casing tubes 31, 32, 33 and the rolling body cages 71, 73 of the anti-friction bearing units 7, 70 are moved telescopically in the longitudinal direction relative to one another, with the result that they can also be called telescopic elements 31, 32, 33, 7, 70 in summary, the intermediate casing tube 32 and the anti-friction bearing unit 7 and 70 being intermediate elements in the sense of the invention.

A positioning device 8 according to the invention has, as elongate guide tracks, continuous guide slots 81, 82, 83, 84, 85 which are radially open with regard to the longitudinal axis L, the guide slot 81 being arranged in the outer casing tube 31, the guide slot 82 being arranged in the rolling body cage 71 of the anti-friction bearing unit 7, the guide slot 83 being arranged in the intermediate casing tube 32, the guide slot 84 being arranged in the rolling body cage 73 of the anti-friction bearing unit 70, and the guide slot 85 being arranged in the inner casing tube 32. A guide pin 86 forms a guide body which extends through all the guide slots 81 82, 83, 84, 85, that is to say penetrates them in the radial direction, transversely with respect to the longitudinal direction L. Here, the guide pin 86 is mounted such that it can be displaced slidingly in the guide slots 81, 82, 83, 84, 85 in the direction of the longitudinal extent, and is held radially in the slot opening is here and is secured radially. The guide pin 86 is therefore mounted in a floating manner with regard to each of the telescopic elements 31, 32, 33, 7, 70.

Figure 5:
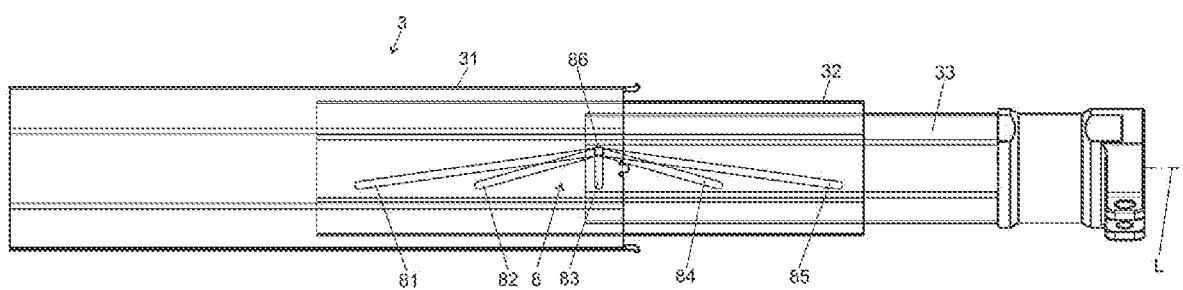
FIG. 5 is a diagrammatic side view of a steering column in an adjusting state.
Figure 6:
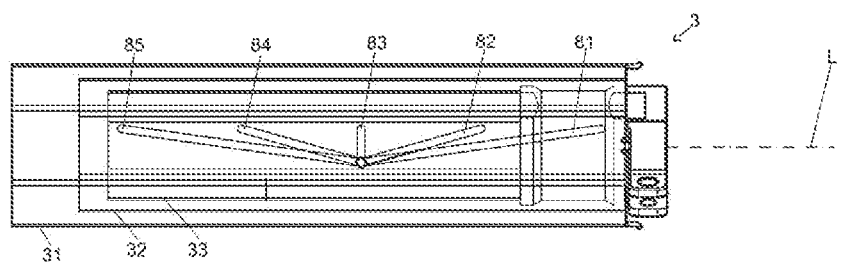
FIG. 6 is a diagrammatic side view of the steering column as in FIG. 5 in a retracted adjusting state.

The arrangement and orientation of the guide slots 81, 82, 83, 84, 85 is illustrated diagrammatically in FIG. 5 in an operating position in a pulled-apart adjusting state, the casing tubes 31, 32, 33 being diagrammatically shown in a transparent manner, and the anti-friction bearing cages 71, 73 being invisible apart from the guide slots 82, 84 which are configured therein, in order that the clarity can be maintained. FIG. 6 shows the pushed-together stowage position in the same view.

The guide slot 81 is inclined to a longer and flatter extent with respect to the longitudinal axis L than the guide slot 82 which is in turn inclined to a flatter extent than the guide slot 83, lying perpendicularly with respect to the longitudinal axis L, in the intermediate casing tube 32. The guide slots 84 and 85 are mirror-inverted relative to the guide slots 82 and 81, arranged with reverse algebraic sign of the inclination relative to the longitudinal axis L.

All the guide slots 81, 82, 83, 84, 85 intersect or overlap in a common overlap portion, where they are penetrated jointly by the guide pin 86. The guide pin 86 forms a slotted guide with each of the guide slots 81, 82, 83, 84, 85. These slotted guides are positively coupled to one another by way of the common guide pin 86, that is to say the guide pin 86 can move only at the same time relative to all the guide slots 81, 82, 83, 84, 85. As a result, the casing tubes 31, 32, 33 and the anti-friction bearing units 7, 70 are positively positioned unambiguously relative to one another in the longitudinal direction in each adjusting position which is passed through during the adjustment. Accordingly, a synchronized linear movement is produced.

If the inner casing tube 33 is adjusted out of the operating position which is shown in FIG. 5 in the direction of the outer casing tube 31, in order to move it in the longitudinal direction into the stowage position which is shown in FIG. 6, the guide pin 86 slides along in all the guide slots 81, 82, 83, 84, 85, as indicated in FIG. 5 by way of the arrows. During the adjustment, the relative positioning in each adjusting position which is passed through is defined unambiguously, until the stowage position is reached, in which the guide pin 86 bears against the other end of the guide slots 81, 82, 83, 84, 85 in the example which is shown.

Figure 7:
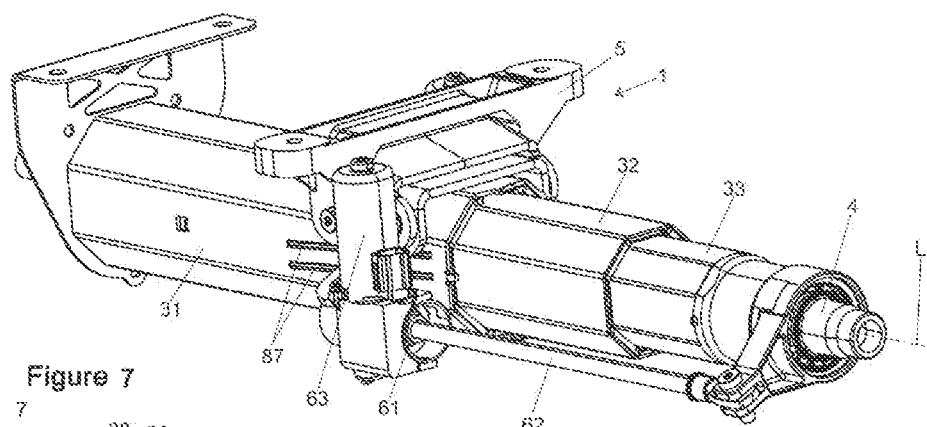
FIG. 7 is a diagrammatic perspective view of an example steering column in a second embodiment.
Figure 8:
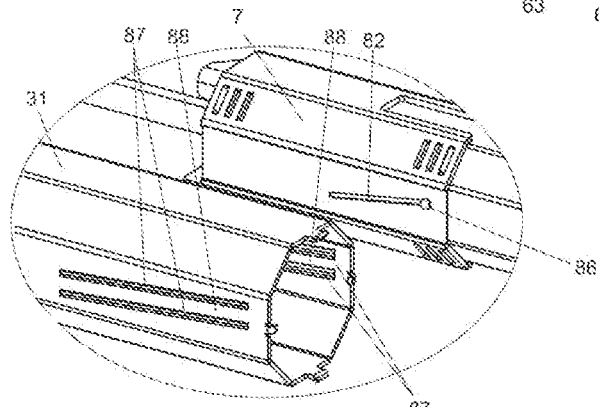
FIG. 8 is an enlarged, detail, exploded view of the steering column according to FIG. 7.

FIGS. 7 and 8 show a modified overall design, in the case of which, instead of the guide slot 81, two parallel, inwardly projecting guide projections 87 are configured on the inside on the outer casing tube 31, for example by way of integral informed webs or formed beads, between which an elongate guide groove 88 is formed as guide track. The guide pin 86 which projects radially to the outside from the guide slot 82 of the anti-friction bearing unit 7 is guided in a linearly sliding manner in this guide groove 88. Apart from the fact that the guide groove 88 does not have a continuous opening like the guide slot 82 of the first embodiment, the configuration and method of operation can be identical or analogous to the first embodiment.

Furthermore, a motorized actuating drive 60 can be provided which can be of similar configuration to the actuating drive 6 as spindle drive, and is arranged between the casing unit 3 and the mounting unit 5, with the result than an adjustment in the height direction H is made possible, as can be seen in FIG. 2.

In the examples which are shown, two positioning units 8 are arranged on opposite sides of the casing unit 3 relative to the longitudinal axis L. Here, the guide slots 81, 82, 83, 84, 85, 88 can be arranged in a mirror-inverted manner with regard to the longitudinal axis L.

The positioning device 8 according to the invention can also be realized if no anti-friction bearing units 7, 70 are provided, with the result that the casing tubes 31, 32, 33 slide telescopically inside one another directly.

It is also possible to arrange more than one intermediate casing tube 32 between the outer casing tube 31 and the inner casing tube 33, for example two, three or more. Here, anti-friction bearing units 7 can be inserted in between.

Instead of the anti-friction bearing units 7, 70, sliding units (not shown here) can also be realized which can have sliding bodies instead of the rolling bodies 72, for example a sliding sleeve made from plastic or the like instead of the rolling body cage 71.

In the same views as FIGS. 1 to 6, FIGS. 9 to 14 show a steering column according to the invention in a second embodiment, the same designations being used for identically acting parts.

Figure 9:
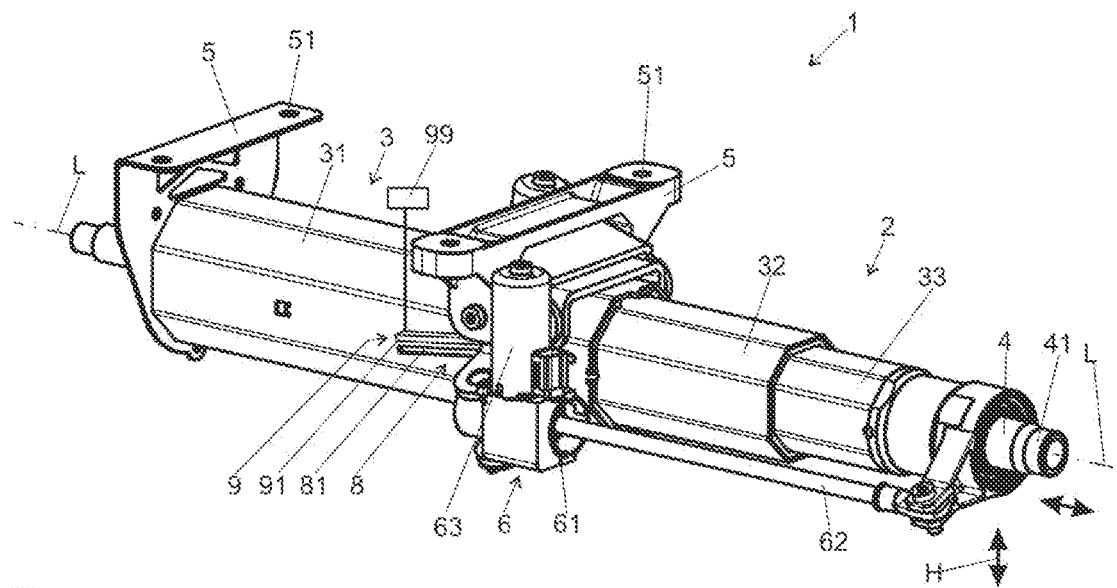
FIG. 9 is a diagrammatic perspective view of a steering column according to second embodiment.

Like FIG. 1, FIG. 9 shows a steering column 1 according to the invention in a view obliquely from behind with regard to the driving direction, which steering column 1 has an actuating unit 2. The actuating unit 2 comprises a casing unit 3 which has an outer casing tube 31, an intermediate casing tube 32 and an inner casing tube 33 which in their entirety are called casing tubes 31, 32 and 33. They are arranged coaxially inside one another such that they can be displaced telescopically in the longitudinal direction which corresponds to the axial direction of a longitudinal axis L, as indicated by way of the double arrow. Here, the intermediate casing tube 32 forms an intermediate element in the sense of the invention.

A steering spindle 4 is mounted in the casing unit 3 such that it can be rotated about the longitudinal axis L, which steering spindle 4 has, at its rear end, a connector portion 41 for attaching a steering wheel (not shown).

The casing unit 3 is held in a two-part mounting unit 5 which has fastening means 51 in the form of openings for attaching to a vehicle body (not shown), for example with the use of screws or the like.

An adjusting drive 6 has a spindle drive with a spindle nut 61 and a threaded spindle 62 which is screwed therein, which spindle nut 61 and threaded spindle 62 can be driven rotationally relative to one another by an electric motor 63. The threaded spindle 62 extends parallel to the longitudinal axis L and is connected to the inner casing tube 33, and a spindle nut 61 is supported on the outer casing tube 31 via the adjusting drive 6 in the longitudinal direction which corresponds to the axial direction of the longitudinal axis L. By way of a relative rotation by means of the motor 63, the threaded spindle 62 and a spindle nut 61 are moved together or apart from one another depending on the rotational direction, as a result of which the inner casing tube 33 is retracted into or extended from the outer casing tube 31 in the axial direction of the longitudinal axis L, as indicated by way of the double arrow. As a result, a longitudinal adjustment is realized, by way of which a steering wheel which is attached to the connector portion 41 can be moved forward into a stowage position, in which the inner casing tube 33 and the intermediate casing tube 32 are moved in the outer casing tube 31, that is to say are lowered toward the front, or into an operating position in the operating region, in which operating position the casing tubes 31, 32 and 33 have been moved out of one another.

As an alternative, the spindle nut 61 can be supported on the inner casing tube 33, and the threaded spindle 62 can be supported on the outer casing tube 31.

Figure 10:
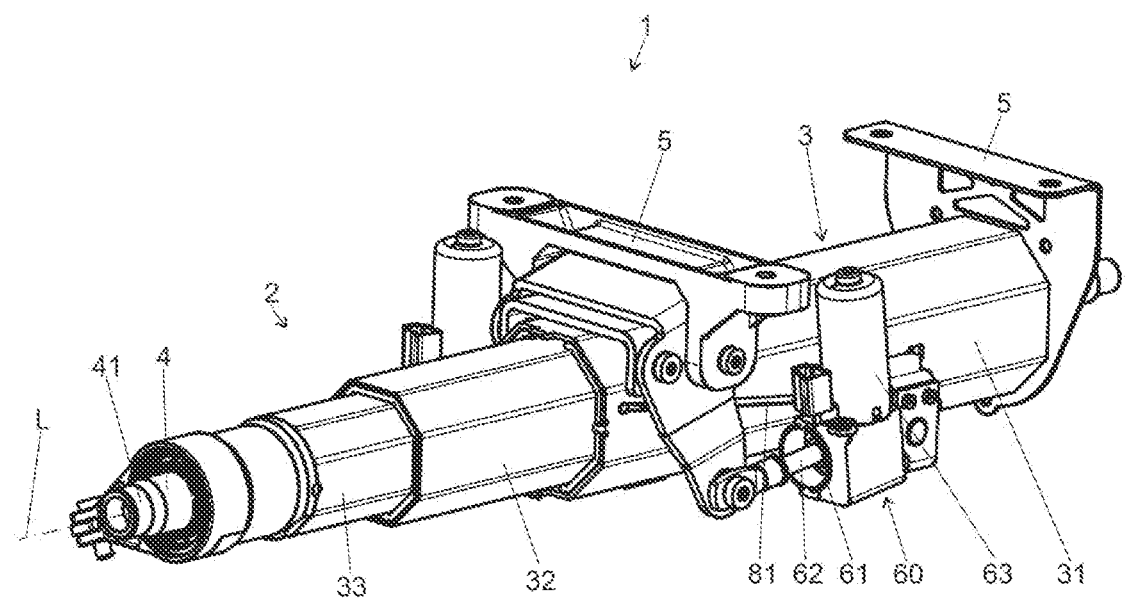
FIG. 10 is another perspective view of the steering column according to FIG. 9.

FIG. 9 shows an adjusting position of the steering column 1 in an operating position, in the case of which the intermediate casing tube 32 and the inner casing tube 33 are moved at least partially out of the outer casing tube 31 in the longitudinal direction toward the rear in relation to the driving direction of the motor vehicle (to the right in the drawing), with the result that the steering wheel which is attached to the connector portion 41 is situated in the operating region for the input of steering commands. FIG. 10 shows the same adjusting state, the inner casing tube being pulled out to the left as a result of the different perspective.

A position detection device 9 according to the invention has a sensor element 91 which is attached to the outer casing tube 31. As shown, the sensor element 91 can have the shape of a strip which is elongate in the longitudinal direction. The sensor unit 91 is connected in a signal-transmitting manner to the evaluation unit 99, for example by means of an electric cable.

Figure 11:
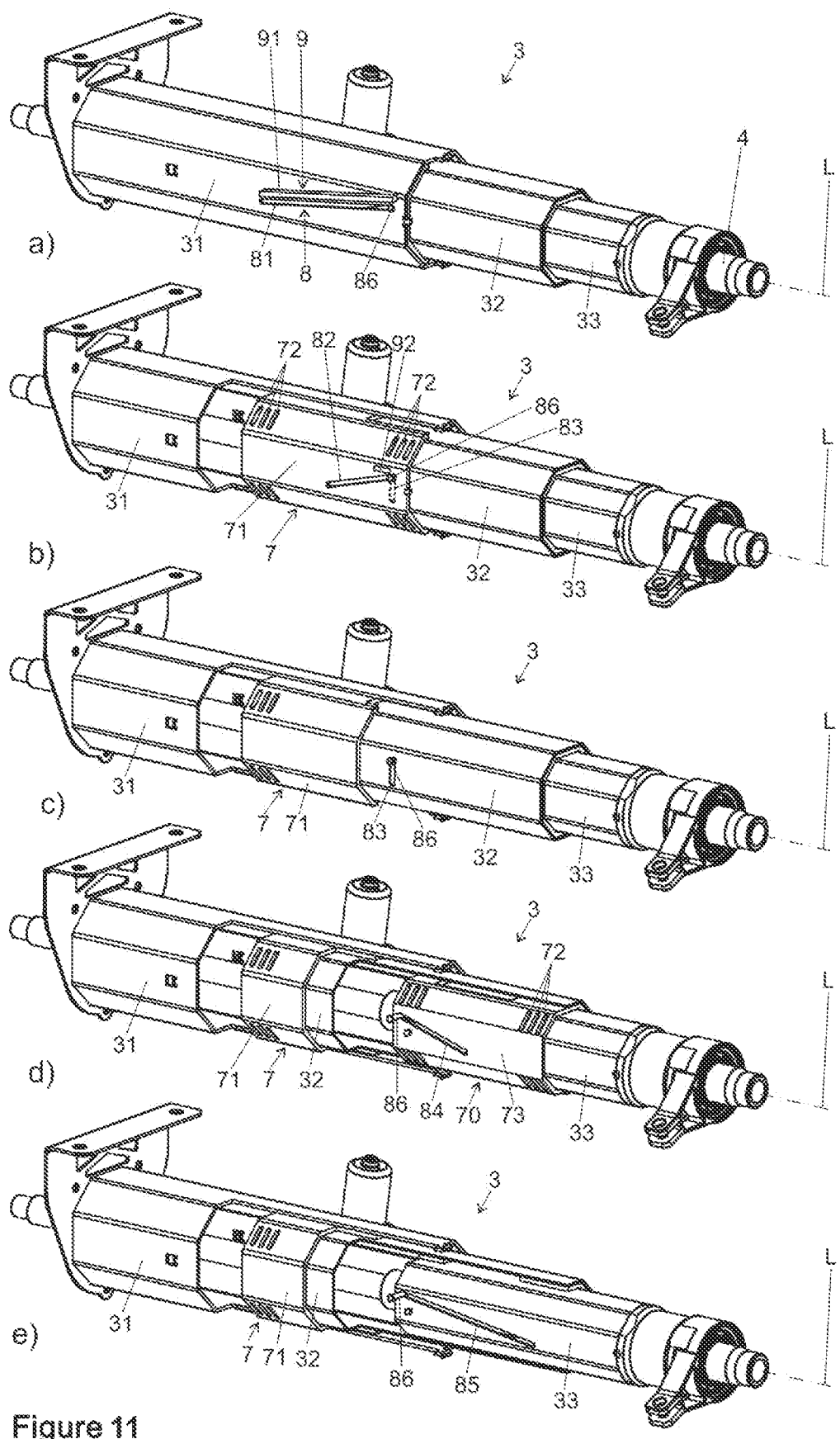
FIG. 11a-e are diagrammatic cutaway views of the steering column according to FIG. 9.
Figure 12:
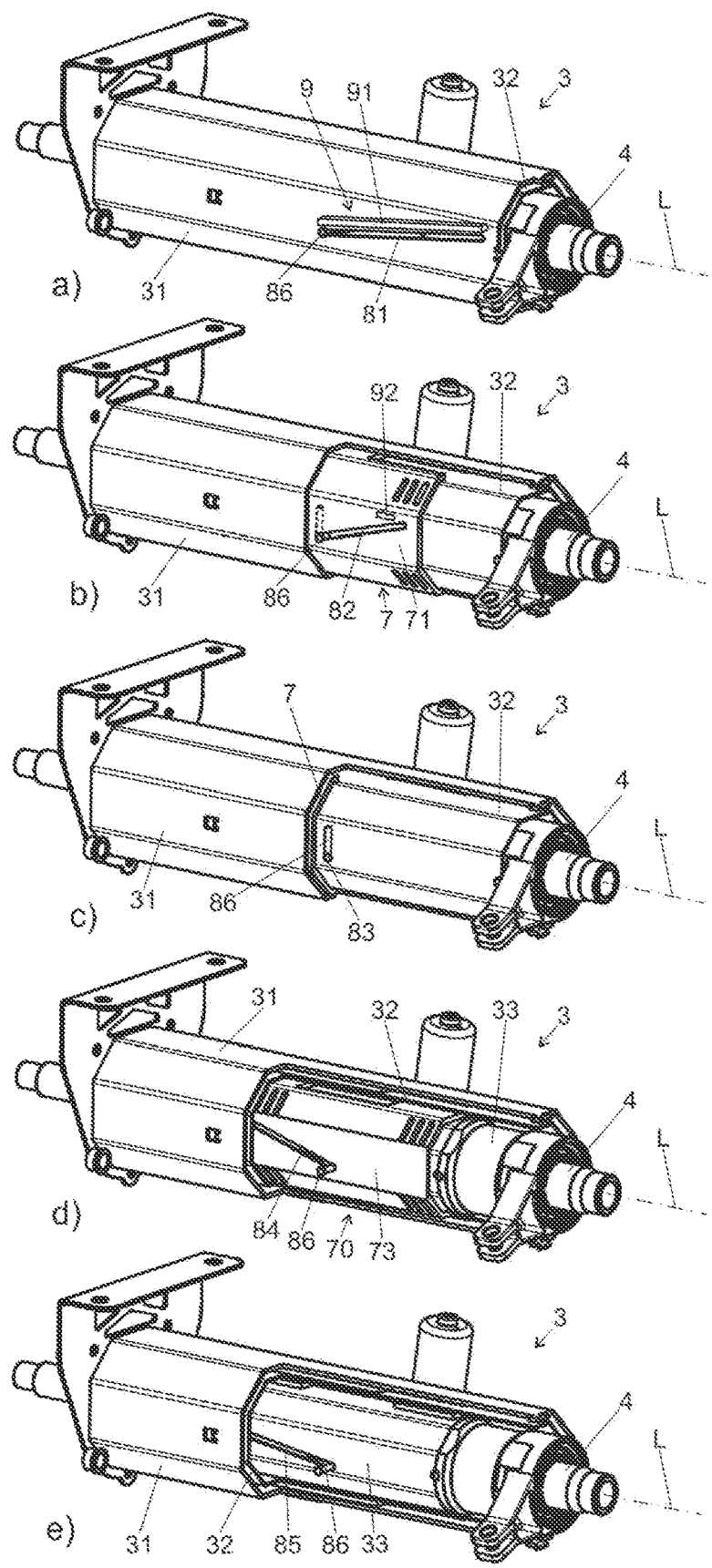
FIG. 12a-e are diagrammatic cutaway views of the steering column in a moved-together adjusting state.

FIG. 11 shows the casing unit 3 individually for improved clarity, in perspective and in the adjusting state according to FIG. 9. In the individual part FIGS. 11*a*, *b*, *c*, *d* and *e*, individual part portions of the casing tubes 31, 32, 33 are cut away and omitted, and expose a respective further view into the interior of the casing unit 3.

In FIG. 11*b*, the outer casing tube 31 is partially omitted. It can be seen therein that an anti-friction bearing unit 7 is arranged coaxially between the casing tubes 31 and 32, which anti-friction bearing unit 7 can be moved telescopically in the longitudinal direction relative thereto and represents an intermediate element in the sense of the invention. The anti-friction bearing unit 7 has a sleeve-shaped rolling body cage 71 which, in the example which is shown, is configured as a roller cage, in which in each case a plurality of rollers 72 are held rotatably as roping bodies, in each case in a manner which is positioned in axially parallel rows to the longitudinal axis L. The rollers 72 roll on the outside on the outer casing tube 31, that is to say on an inner surface of the outer casing tube 31, and on the inside on the intermediate casing tube 32, that is to say on an outer surface of the intermediate casing tube 32, with the result that a linear anti-friction bearing system is formed in the longitudinal direction between the casing tubes 31 and 32.

It can be seen in FIG. 11*b* that a sensor element 92 is arranged on the rolling body cage 71 which represents an intermediate element which can telescope relative to the outer casing tube 31. This sensor element 92 corresponds with the sensor element 91 of the position detection apparatus 9. If the rolling body cage 71 is moved relative to the casing tube 31 in the longitudinal direction during the adjustment of the steering column 1, the sensor element 92 is at the same time moved relative to the sensor element 91 in the longitudinal direction. The relative positioning of the rolling body cage 71 with respect to the casing tube 31 can be determined by means of an electronic evaluation by virtue of the fact that the sensor elements 91 and 92 are configured as an electronic transmitter/receiver pair, for example for a capacitive electronic position measuring method. To this end, the sensor elements 91 and 92 are connected to a suitable electronic evaluation unit (not shown here). The position measured value is determined in the evaluation unit from the electronic measured values of the sensor elements 91 and 92, from which position measured value a length measured value is calculated. This length measured value corresponds with the spacing of the casing tubes 31 and 33 in the longitudinal direction, and can be utilized for determining the position of the steering input means which is attached to the steering spindle 4, for example a steering wheel in the vehicle interior compartment.

As shown, the elongate sensor element 91 can be arranged approximately parallel to the guide slot 81, or approximately parallel to the longitudinal axis L. It is essential here merely that a relative position determination in the longitudinal direction between the rolling body cage 71 on the casing tube 31 is made possible. For example, length measuring systems which are commercially available can be used for the position detection device 9, as a result of which a compact overall design and reliable operation are insured.

In FIG. 11*c*, the anti-friction bearing unit 7 is partially cut away and omitted, and exposes a view freely onto the outer side, concealed by the rolling body cage 71 in FIG. 11*b*, of the intermediate casing tube 32 with the guide slot 83.

In FIG. 11*d*, the intermediate casing tube 32 is partially omitted. It can be seen therein that a second anti-friction bearing unit 70 is arranged coaxially between the intermediate casing tube 32 and the inner casing tube 33, which second anti-friction bearing unit 70 is in principle configured like the anti-friction bearing unit 7 and represents an intermediate element which can be moved telescopically in the longitudinal direction relative to the casing tubes 32 and 33 in the sense of the invention. The anti-friction bearing unit 70 has a sleeve-shaped rolling body cage 73, in which in each case a plurality of rollers 72 are held rotatably as rolling bodies, in each case in a manner which is positioned in axially parallel rows to the longitudinal axis L. The rollers 72 roll on the outside on the intermediate casing tube 32, that is to say on an inner surface of the intermediate casing tube 32, and on the inside on the inner casing tube 33, that is to say on an outer surface of the inner casing tube 33, with the result that the linear anti-friction bearing system is formed in the longitudinal direction between the casing tubes 32 and 33.

In FIG. 11*e*, the anti-friction bearing unit 70 is partially omitted and exposes a view of the outer side, concealed by the rolling body cage 73 in FIG. 11*d*, of the inner casing tube 33.

FIGS. 12*a* to 12*e* show that the casing unit 3 and the same perspective as in FIGS. 11*a* to 11*e* in the moved-together adjusting state which corresponds to the stowage position, in which the inner casing tube 33 dips into the intermediate casing tube 32 to a maximum extent (to the left in the drawing), and the latter is lowered into the outer casing tube 31. As a result, the casing tube 3 and therefore the steering column 1 are shortened to a maximum extent in the longitudinal direction, with the result that the steering wheel can be stowed outside the operating region, for example in autonomous driving operation.

In the case of the telescopic retraction out of the operating position which is shown in FIGS. 11*a*-11*e* into the stowage position which is shown in FIGS. 12*a*-12*e*, the casing tubes 31, 32, 33 and the rolling body cages 71, 73 of the anti-friction bearing units 7, 70 are moved telescopically in the longitudinal direction relative to one another, with the result that they can also be called telescopic elements 31, 32, 33, 7, 70 in summary, the intermediate casing tube 32 and the anti-friction bearing unit 7 and 70 being intermediate elements in the sense of the invention.

A positioning device 8 according to the invention has, as elongate guide tracks, continuous guide slots 81, 82, 83, 84, 85 which are open radially with regard to the longitudinal axis L, the guide slot 81 being arranged in the outer casing tube 31, the guide slot 82 being arranged in the rolling body cage 71 of the anti-friction bearing unit 7, the guide slot 83 being arranged in the intermediate casing tube 32, the guide slot 84 being arranged in the rolling body cage 73 of the anti-friction bearing unit 70, and the guide slot 85 being arranged in the inner casing tube 32. A guide pin 86 forms a guide body which extends through all the guide slots 81, 82, 83, 84, 85, that is to say penetrates them in the radial direction, transversely with respect to the longitudinal axis L. Here, the guide pin 86 is mounted such that it can be displaced slidingly in the direction of the longitudinal extent in the guide slots 81, 82, 83, 84, 85, and is held radially and secured radially here in the slot openings. Therefore, the guide pin 86 is mounted in a floating manner with regard to each of the telescopic elements 31, 32, 33, 7, 70.

In one special embodiment, the second sensor element can be formed by way of the guide pin 86 or can be coupled to the latter in such a way that they cannot be moved with respect to one another, that is to say they move together.

Figure 13:
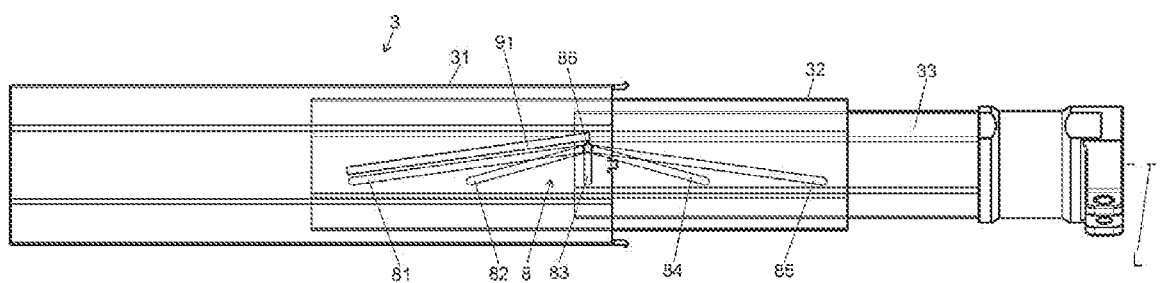
FIG. 13 is a diagrammatic side view of the steering column according to FIG. 9 in an adjusting state.
Figure 14:
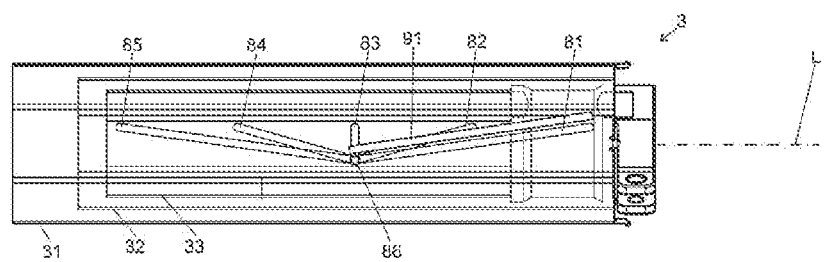
FIG. 14 is a diagrammatic side view of the steering column as in FIG. 13 in a retracted adjusting state.

The arrangement and orientation of the guide slots 81, 82, 83, 84, 85 is illustrated diagrammatically in FIG. 13 in a pulled-apart adjusting state in an operating position, the casing tubes 31, 32, 33 being diagrammatically shown transparently, and the anti-friction bearing cages 71, 73 being invisible apart from the guide slots 82, 84 which are configured therein, in order that the clarity can be maintained. FIG. 14 shows the pushed-together stowage position in the same view.

The guide slot 81 is longer and is inclined in a flat manner with respect to the longitudinal axis L than the guide slot 82 which is in turn inclined in a flat manner than the guide slot 83, lying perpendicularly with respect to the longitudinal axis L, in the intermediate casing tube 32. The guide slots 84 and 85 are arranged mirror-inverted relative to the guide slots 82 and 81, with a reversed algebraic sign of the inclination relative to the longitudinal axis L.

All the guide slots 81, 82, 83, 84, 85 intersect or overlap in a common overlap portion, where they are penetrated jointly by the guide pin 86. The guide pin 86 forms a slotted guide with each of the guide slots 81, 82, 83, 84, 85. These slotted guides are positively coupled to one another by way of the common guide pin 86, that is to say the guide pin 86 can move only at the same time relative to all the guide slots 81, 82, 83, 84, 85. As a result, the casing tubes 31, 32, 33 and the anti-friction bearing units 7, 70 are positively positioned unambiguously relative to one another in the longitudinal direction in each adjusting position which is passed through during the adjustment. A synchronized linear movement is produced accordingly.

If the inner casing tube 33 is adjusted out of the operating position which is shown in FIG. 13 in the direction of the outer casing tube 31, in order to retract it in the longitudinal direction into the stowage position which is shown in FIG. 14, the guide pin 86 slides along in all the guide slots 81, 82, 83, 84, 85, as indicated by way of the arrows in FIG. 13. During the adjustment, the relative position is unambiguously defined in each adjusting position which is passed through, until the stowage position is reached, in which the guide pin 86 bears against the other end of the guide slots 81, 82, 83, 84, 85 in the example which is shown.

Instead of the guide slot 81, two parallel, inwardly projecting guide projections 87 can be configured on the inside on the outer casing tube 31, for example by way of integrally formed webs or formed beads, between which an elongate guide groove 88 is formed as guide track. In this guide groove 88, the guide pin 86 which projects radially outward from the guide slot 82 of the anti-friction bearing unit 7 is guided in a linearly sliding manner. Apart from the fact that the guide groove 88 does not have a continuous opening like the guide slot 82 of the first embodiment, the configuration and method of operation can be identical or analogous with respect to the first embodiment.

Furthermore, a motorized actuating drive 60 can be provided in all the embodiments which are shown, which motorized actuating drive 60 can be configured similarly to the actuating drive 6 as a spindle drive and is arranged between the casing unit 3 and the mounting unit 5, with the result that an adjustment in the height direction H is made possible, as can be seen in FIG. 10.

In the examples which are shown, to positioning unit 8 are arranged on opposite sides of the casing unit 3 relative to the longitudinal axis L. Here, the guide slots 81, 82, 83, 84, 85, 88 can be arranged in a mirror-inverted manner with regard to the longitudinal axis L.

The positioning device 8 according to the invention can also be realized if no anti-friction bearing units 7, 70 are provided, with the result that the casing tubes 31, 32, 33 telescopically slide directly in one another.

It is also possible to arrange more than one intermediate casing tube 32 between the outer casing tube 31 and the inner casing tube 33, for example two, three or more. Here, anti-friction bearing units 7 can be inserted in between.

Instead of the anti-friction bearing units 7, 70, plain bearing units (not shown here) can also be realized which can have sliding bodies instead of the rolling bodies 72, for example a sliding sleeve made from plastic or the like instead of the rolling body cage 71. As an alternative, a plain bearing unit can also be formed approximately like a rolling body cage 11, but without rolling bodies, and can be configured as a sliding sleeve from a satisfactorily slippery material, for example a plastic.

What is claimed is:

1. A steering column for a motor vehicle, comprising:
a casing unit in which a steering spindle is mounted such that the steering spindle is rotatable about a longitudinal axis that extends in a longitudinal direction, the casing unit including:
at least two telescopically guided casing tubes that are adjustable relative to one another in the longitudinal direction,
an intermediate element that is movable in the longitudinal direction, the intermediate element being arranged between the at least two telescopically guided casing tubes, and
a positioning device for positioning the intermediate element in the longitudinal direction relative to the at least two telescopically guided casing tubes, wherein the positioning device comprises elongate guide tracks that are arranged on the at least two telescopically guided casing tubes and the intermediate element, wherein the elongate guide tracks are configured to interact with one another to position the at least two telescopically guided casing tubes and the intermediate element relative to one another in a defined manner, wherein the elongate guide tracks extend in an inclined manner relative to one another and relative to the longitudinal axis.

2. The steering column for a motor vehicle of claim 1 wherein the elongate guide tracks comprise guide depressions or guide projections.

3. The steering column for a motor vehicle of claim 1 comprising a guide body that is guided on the elongate guide tracks such that the guide body positions the at least two telescopically guided casing tubes and the intermediate element relative to one another in a defined manner.

4. The steering column for a motor vehicle of claim 3 wherein the elongate guide tracks intersect in an overlap portion, with the guide body being arranged in the overlap portion.

5. The steering column for a motor vehicle of claim 3 wherein the guide body is held on one of the at least two telescopically guided casing tubes or the intermediate element such that the guide body is immovable in the longitudinal direction.

6. The steering column for a motor vehicle of claim 3 wherein the elongate guide tracks have guide slots through which the guide body extends transversely with respect to the longitudinal axis.

7. The steering column for a motor vehicle of claim 6 wherein the guide body is mounted in a floating manner in the guide slots.

8. The steering column for a motor vehicle of claim 7 wherein the guide body is mounted such that the guide body is movable transversely relative to the longitudinal direction.

9. The steering column for a motor vehicle of claim 1 wherein at least two of the elongate guide tracks are distributed over a circumference of the at least two telescopically guided casing tubes.

10. The steering column for a motor vehicle of claim 1 wherein the intermediate element has a coaxial anti-friction bearing unit or a sliding unit that is configured to telescope relative to the at least two telescopically guided casing tubes.

11. The steering column for a motor vehicle of claim 1 wherein the intermediate element includes an intermediate casing tube.

12. A steering column for a motor vehicle, comprising:
a casing unit in which a steering spindle is mounted such that the steering spindle is rotatable about a longitudinal axis that extends in a longitudinal direction, the casing unit including:
at least two telescopically guided casing tubes that are adjustable relative to one another in the longitudinal direction,
a first intermediate element that is movable in the longitudinal direction, the first intermediate element being arranged between the at least two telescopically guided casing tubes, and
a position detection device configured to detect a relative position of the at least two telescopically guided casing tubes; and
a positioning device that is arranged on and interacts with the at least two telescopically guided casing tubes and the first intermediate element such that the at least two telescopically guided casing tubes and the first intermediate element are positioned relative to one another in a defined manner, wherein the positioning device is configured to detect a relative position of the first intermediate element with respect to at least one of the at least two telescopically guided casing tubes or a second intermediate element.

13. A method for measuring an adjusting state of a steering column for a motor vehicle, the steering column comprising a casing unit in which a steering spindle is mounted such that the steering spindle is rotatable about a longitudinal axis that extends in a longitudinal direction, with the casing unit having at least two telescopically guided casing tubes that are adjustable relative to one another in the longitudinal direction and having a first intermediate element that is movable in the longitudinal direction and is arranged between the at least two telescopically guided casing tubes, the method comprising:
determining a length measured value that is correlated with an adjusting state from a relative position of the at least two telescopically guided casing tubes, wherein the at least two telescopically guided casing tubes and the first intermediate element are positioned relative to one another in a defined manner;
measuring with a position detection device as a position measured value a relative position of the first intermediate element relative to at least one of the at least two telescopically guided casing tubes or a second intermediate element; and
calculating a length measured value from the measured position measured value.

* * * * *